United States Patent
Davidson

Patent Number: 5,822,108
Date of Patent: Oct. 13, 1998

[54] DIGITAL OPTICAL POWER MODULATOR

[75] Inventor: Howard L. Davidson, San Carlos, Calif.

[73] Assignee: Sun Microsystems, Inc., Mountain View, Calif.

[21] Appl. No.: 879,507

[22] Filed: Jun. 20, 1997

[51] Int. Cl.$^6$ .............................. G02F 1/01; G02F 1/29
[52] U.S. Cl. ........................................ 359/276; 359/320
[58] Field of Search .................................. 359/276, 277, 359/316, 320, 583; 385/14

[56] References Cited

U.S. PATENT DOCUMENTS

| | | | |
|---|---|---|---|
| 4,291,950 | 9/1981 | Pepper et al. | 359/252 |
| 5,131,060 | 7/1992 | Sakata | 385/2 |
| 5,168,535 | 12/1992 | Laor | 385/16 |
| 5,542,014 | 7/1996 | Lerminiaux | 385/45 |
| 5,724,178 | 3/1998 | Grandpierre et al. | 359/289 |

*Primary Examiner*—Georgia Y. Epps
*Assistant Examiner*—John Woolner
*Attorney, Agent, or Firm*—Conley, Rose & Tayon, PC; B. Noel Kivlin

[57] ABSTRACT

An integrated digital light modulator. In one embodiment, a light beam is split into a set of binary weighted beams which are then individually switched on or off by an optical switch. The weighted beams which are conveyed by the optical switches are then recombined to produce a modulated beam. In this manner, a fast inexpensive integrated digital light modulator may be advantageously obtained. Broadly speaking, the present invention contemplates a digital optical power modulator that comprises a binary power divider and an optical modulator. The binary power divider is configured to receive an input light beam and split it into a set of weighted beams. The optical powers of the weighted beams are related in that the ratio of the optical powers of any two weighted beams is substantially an integer power of two. The optical modulator receives the set of weighted beams from the binary power divider and receives a digital signal. The optical modulator is configured to convey weighted beams that correspond to asserted bits in the digital signal. The present invention may further include an optical combiner coupled to receive the weighted beams from the optical modulator and configured to combine the weighted beams to produce a modulated beam having a discrete optical power. A lookup table may be included to convert a desired digital power value into the digital signal provided to the optical modulator.

16 Claims, 3 Drawing Sheets

DIGITAL OPTICAL POWER MODULATOR

BACKGROUND OF THE INVENTION

1. Field of the Invention

This invention relates to the field of optics systems, and in particular to an element for digital modulation of an optical beam.

2. Description of the Related Art

Digital to analog converters are well-known in the prior art as a means for converting digital electrical signals into amplitude modulated analog signals of many forms (electrical, mechanical, acoustic, magnetic) for coupling digital and analog devices. Since the speed of light provides the lower limit on information signal transfer delay, this motivates the use of light (or electromagnetic waves in general) for high speed digital communication. Near infrared light (e.g. 860 nm, 1.3 μm, 1.5 μm wavelengths) further offers an opportunity for directed, high-bandwidth digital communication. Many light sources, modulators, transport media, and sensors are well known. However, a need exists for a digital light modulator which can be made in integrated form on a substrate. Integrated light modulators are highly nonlinear and hence tend to be used only as on/off optical switches.

In U.S. Pat. No. 4,291,950 which issued Sep. 29, 1981, Pepper and Klein disclose a device which may be used as a digital modulator of an input light beam. The disclosed device includes a Stark cell having a gaseous medium that exhibits a dichroic absorption resonance at a frequency in the vicinity of a light beam, and that further exhibits birefringence at frequencies slightly above and below the absorption resonance frequency.

In U.S. Pat. No. 5,168,535 which issued Dec. 1 1992, Laor discloses an integrated optic switch in which an input optical fiber is coupled to propagate a wide angle beam along a thin film optical waveguide on a substrate. A light receptor having an optical receptor fiber is positioned in the path of the beam. The light receptor includes a lens for focusing the beam to a spot of light and a transducer for aligning the spot and the receptor fiber. Discrete changes in the frequency of the voltage applied to the transducer will cause discrete shifts in the position of the spot.

In U.S. Pat. No. 5,542,014 which issued Jul. 30, 1996, Lerminiaux and Trouchet disclose a divider by 2 of optical power received at an input and two groups of single mode waveguides coplanar to the divider and symmetrical relative to the axis of symmetry of the divider. The groups are composed of waveguide sections connected in tree and branch fashion by Y junctions.

An integrated digital light modulator would provide an inexpensive mechanism for optical digital communications signals which are multi-level amplitude modulated (rather than simple on/off binary signals), and which could therefore provide an increased information carrying capacity. It is expected that digital modulation of light beam intensities will have many other applications as well, including digital displays.

SUMMARY OF THE INVENTION

The problems outlined above are in large part solved by an integrated digital light modulator. In one embodiment, a light beam is split into a set of binary weighted beams which are then individually switched on or off by an optical switch. The weighted beams which are conveyed by the optical switches are then recombined to produce a modulated beam. In this manner, a fast inexpensive integrated digital light modulator may be advantageously obtained.

Broadly speaking, the present invention contemplates a digital optical power modulator that comprises a binary power divider and an optical modulator. The binary power divider is configured to receive an input light beam and split it into a set of weighted beams. The optical powers of the weighted beams are related in that the ratio of the optical powers of any two weighted beams is substantially an integer power of two. The optical modulator receives the set of weighted beams from the binary power divider and receives a digital signal. The optical modulator is configured to convey weighted beams that correspond to asserted bits in the digital signal. The optical modulator may further include an optical combiner coupled to receive the weighted beams from the optical modulator and configured to combine the weighted beams to produce a modulated beam having a discrete optical power. A lookup table may be included to convert a desired digital power value into the digital signal provided to the optical modulator.

BRIEF DESCRIPTION OF THE DRAWINGS

Other objects and advantages of the invention will become apparent upon reading the following detailed description and upon reference to the accompanying drawings in which.

Figure 1:
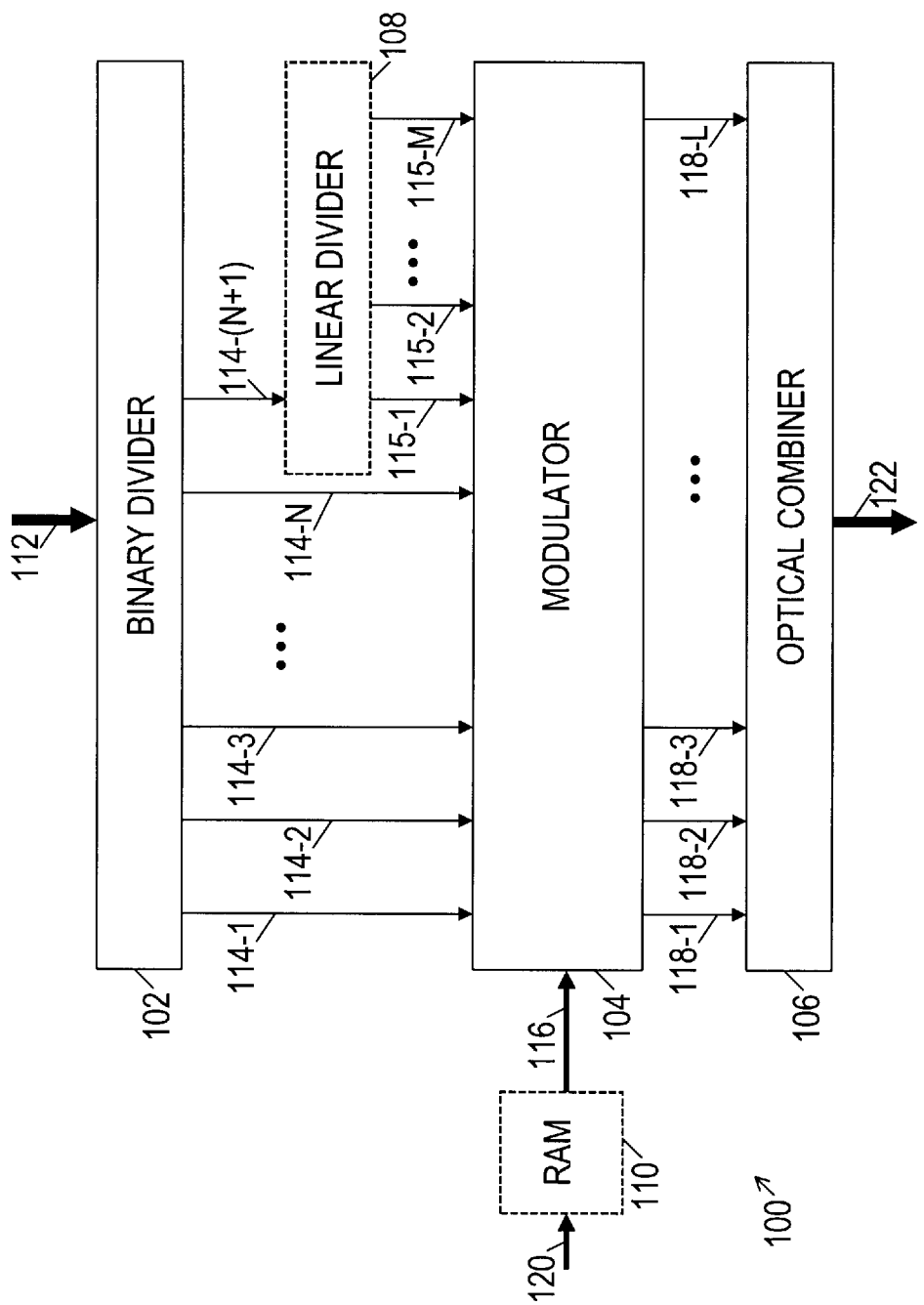
FIG. 1 is a functional diagram of an integrated digital optical power modulator.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 shows a functional diagram of a digital optical power modulator 100. Digital optical power modulator 100 includes a binary power divider 102, an optical modulator 104, and an optical combiner 106. For precision operation, the digital optical power modulator 100 may further include a linear power divider 108 and a lookup table 110. The binary power divider 102 receives an input light beam 112 and splits it into a set of N+1 weighted beams 114-1 through 114-(N+1) (referred to collectively as weighted beams 114). The linear power divider may be coupled to receive one of the weighted beams 114-(N+1) and split it into a second set of weighted beams 115-1 through 115-M (referred to collectively as weighted beams 115). The optical modulator 104 is coupled to receive the weighted beams 114 from the binary power divider 102. When the linear power divider 108 is present, the optical modulator 104 is also coupled to receive the second set of weighted beams 115. Optical modulator 104 gates the beams in an on/off fashion in response to a digital signal 116 to produce a set of gated beams 118-1 through 118-L (referred to collectively as gated beams 118). For precision control, lookup table 110 may be used to convert a desired digital power value 120 into digital signal 116. Optical combiner 106 combines the gated beams 118 to produce a modulated beam 122.

Digital optical power modulator 100 receives an input light beam 112 and a digital electrical signal 116 and provides a modulated beam 122 with discrete amplitude-modulated optical power levels. Digital optical power modulator may advantageously provide a fast, inexpensive modulation method which can be integrated onto a substrate. Digital signal 116 is provided as a group of bit signals. Each bit signal regulates an optical switch in optical modulator 106, thereby controlling the combination of weighted beams 114, 115 which are added together by optical combiner 106 to form modulated beam 122.

Figure 2:
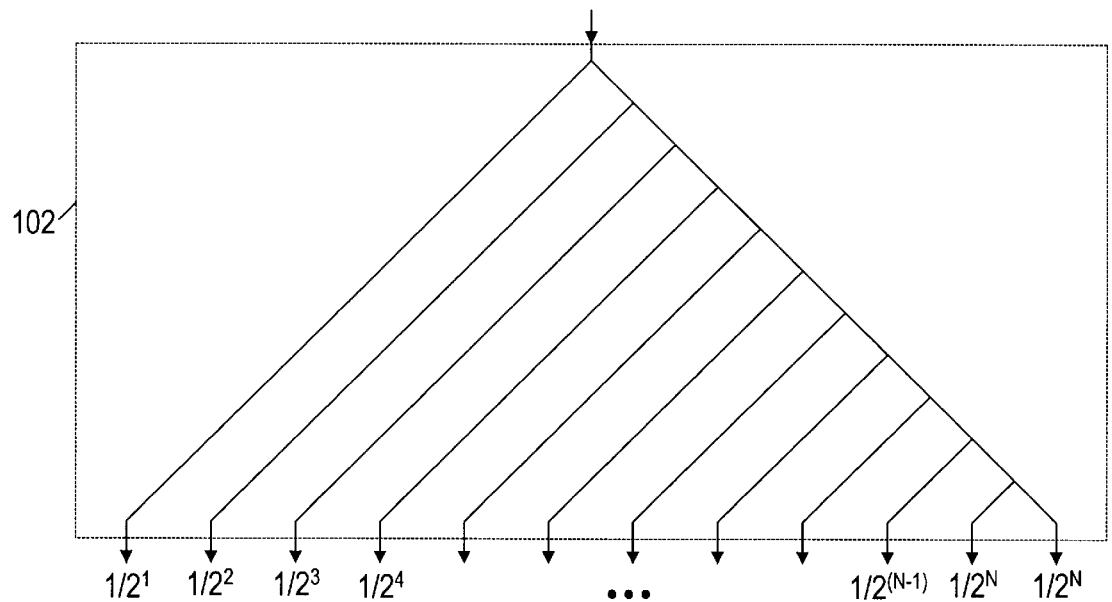
FIG. 2 is a schematic illustration of a binary power divider.

Turning to FIG. 2 with continued reference to FIG. 1, the operation of binary power divider 102 is shown. Binary power divider 102 splits input light beam 112 into weighted beams 114 using of a series of Y junctions that each split an incoming light beam into two light beams each having half the optical power of the incoming beam. The linear configuration of the Y branches shown in FIG. 2 provides the binary optical power distribution as follows. The first Y junction splits input light beam 112 into two half-power beams, one of which is provided as output weighted beam 114-1, and the other of which is provided to the next Y junction. The second Y junction splits the half-power beam into two quarter-power beams, one of which is provided as output weighted beam 114-2, and the other of which is forwarded to the next Y junction. This continues until N Y junctions have split the input light beam N times and provided output weighted beams 114-1 through 114-N having corresponding optical powers ½ through $½^N$ times the input optical power. Both beams from the final Y junction are provided as output. The second beam, weighted beam 114-(N+1) may be coupled directly to optical modulator 104, or it may be coupled to an optional linear power divider 108.

Y junctions which split an incoming beam into two half-power beams are well-known in the prior art, although this configuration of Y junctions is believed to be novel. Waveguides which split off of a main wave guide at a small angle will transport a portion of the optical power of the main beam. Two half-power beams can be provided by making the main wave guide terminate in two waveguides which separate at a small angle. The waveguides may be implemented as optical fibers, etched grooves in a substrate, ridges of optical material deposited on a substrate, or regions of high index of refraction polymer clad with lower index of refraction polymer. The accuracy of the power division can typically be made between one part in $10^3$ and one part in $10^4$ with planar waveguide devices (devices having waveguides created on a substrate, typically used to form an optical integrated circuit).

Figure 3:
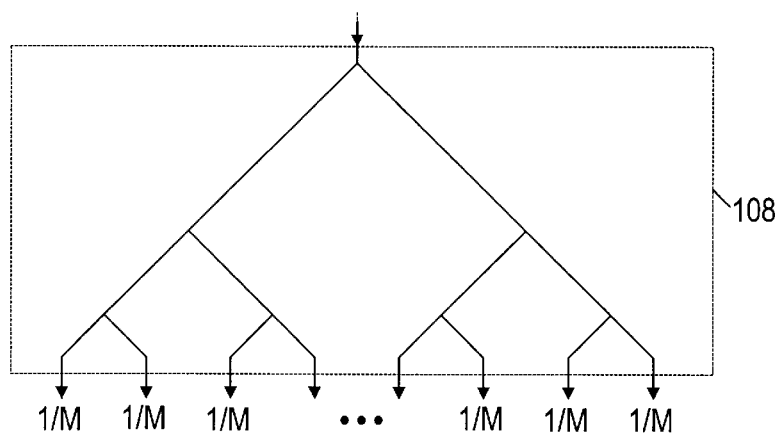
FIG. 3 is a schematic illustration of a linear power divider.

Turning to FIG. 3 with continued reference to FIG. 1, the operation of linear power divider 108 is illustrated. Linear power divider 108 evenly splits weighted beam 114-(N+1) into M weighted beams 115, each with 1/M of the optical power of weighted beam 114-(N+1). This may be done with a binary tree of Y junctions that each split an incoming light beam into two light beams having half the optical power of the incoming light beam. The output beams of the first Y junction are split identically, each beam being split in half by a second-level Y junction. Each of the four resulting beams are then split evenly by four third-level Y junctions. The number of levels in the binary tree of Y junctions determines the number of equal-power beams that are provided as output weighted beams 115.

Figure 4:
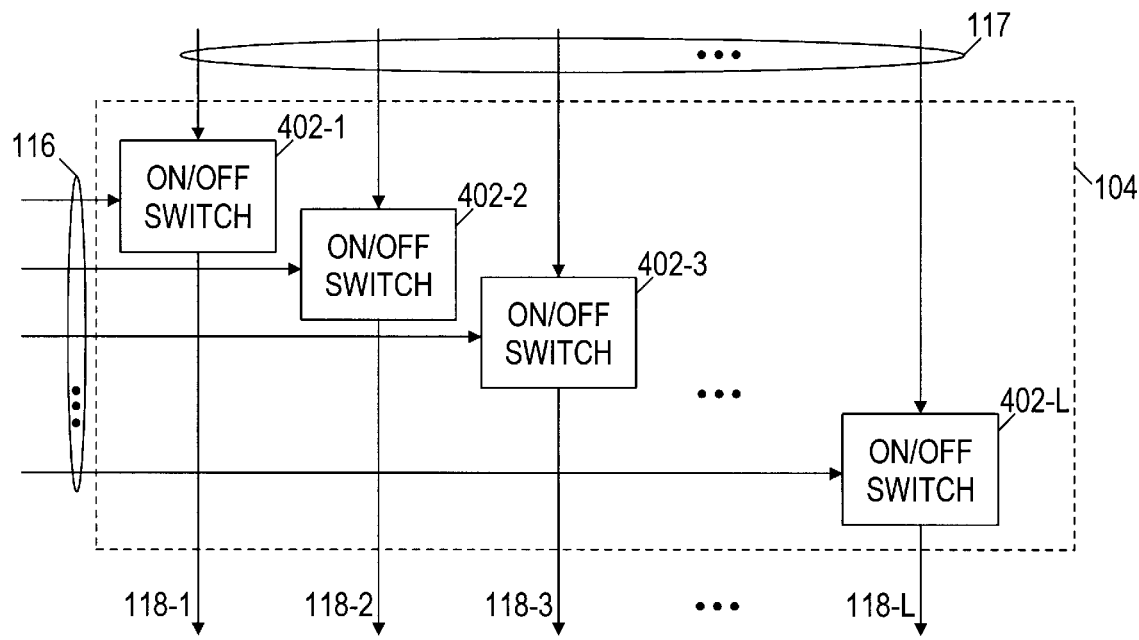
FIG. 4 is a functional diagram of an optical modulator.

Turning now to FIG. 4, a functional diagram of optical modulator 104 is shown. Optical modulator 104 receives a plurality of input light beams 117 and individually gates them in accordance with the corresponding bits of digital signal 116. Input light beams 117 include weighted beams 114, 115. Optical modulator 104 comprises a set of optical switches 402-1 through 402-L (referred to collectively as optical switches 402) configured to produce gated beams 118-1 through 11 8-L (referred to collectively as gated beams 118). Each optical switch is coupled to receive an input light beam 117 and a control bit 116, and configured to convey the input light beam 117 as gated beam 118 when control bit 116 is asserted, and configured to block or deflect the input light beam 117 when the control bit 116 is de-asserted.

Optical switches 402 may be implemented in a variety of ways. For example, the switches may be made using non-linear optical polymers, lithium niobate, or gallium-arsenide (GaAs), materials which alter their index of refraction, and/or optical transmissivity under applied electric fields. The contrast ratio in available optical switches varies from $10^2$:1 to $10^4$:1. A switch towards the low contrast end of this range will have a higher off-state leakage, about one least-significant bit for a six bit converter. When the optical switches do not provide a high enough contrast ratio, two switches may be placed in series to square the contrast ratio. This would allow up to a 26 bit converter, depending on the switches used.

Figure 5:
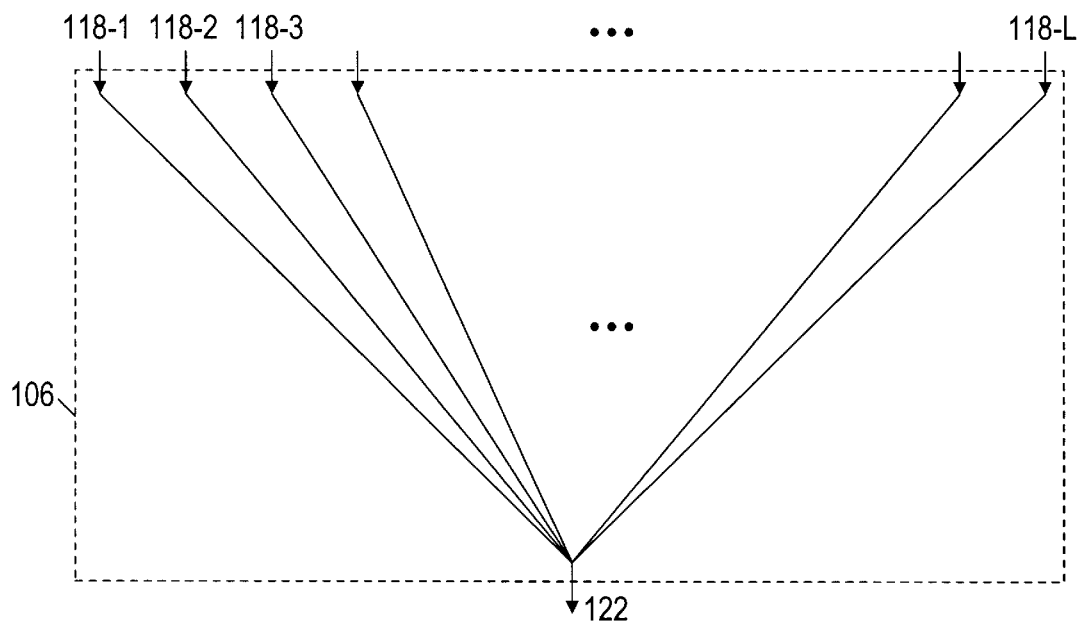
FIG. 5 is a schematic illustration of an optical combiner.

Turning now to FIG. 5, the operation of optical combiner 106 is illustrated. Gated beams 118 are routed through waveguides to an output waveguide where their intensities additively combine to form modulated beam 122. The optical combiner 106 of FIG. 5 shows the gated beams as being combined at a common junction, but other embodiments may be used. In particular, the optical combiner 106 may take the form of the linear power divider of FIG. 3 with inputs and outputs reversed. In this embodiment, the gated beams are pairwise combined, then the resultant beams are pairwise combined, then the successive beams are pairwise combined, and this continues until only one final beam results.

Returning now to FIG. 1, an optional lookup table 110 is shown converting a desired digital power value 120 into a digital signal 116. Lookup table 110 provides a method of compensating for imperfections in the power dividers and optical switches. After construction of digital optical power modulator 100, the intensity of modulated beam 122 may be measured for various configurations of optical switches 402 to determine which configuration best approximates the desired digital power value 120. The configuration is then stored in lookup table 110 so that it may then be provided as digital signal 116 in response to the desired digital power value 120.

In one embodiment, the number of desired digital power values is $2^N$, and the nth power value is indicated by a binary representation of n−1. The configurations of optical switches that produce the most uniform intensity steps between full intensity (all switches on except half of the switches gating weighted beams 115) and minimum intensity (all switches off except half of the switches gating weighted beams 115) are sought. If due to an imperfection, the first Y junction in the binary power divider 102 does not split the optical power exactly in half, then weighted beam 114-1 has a slight surplus or deficit of optical power. The surplus or deficit of this beam or any other weighted beam 114 can be adjusted with high precision by decreasing (for a surplus) or increasing (for a deficit) the number of switches conveying weighted beams 115.

Numerous variations and modifications will become apparent to those skilled in the art once the above disclosure is fully appreciated. It is intended that the following claims be interpreted to embrace all such variations and modifications.

What is claimed is:

1. A digital optical power modulator that comprises:
a binary power divider configured to receive an input light beam and responsively provide a set of weighted beams with corresponding optical powers, wherein a ratio of the optical powers of any two weighted beams is substantially an integer power of two; and
an optical modulator coupled to receive the set of weighted beams from the binary power divider, wherein the optical modulator is configured to receive a first digital signal having a binary representation with bits which correspond to the weighted beams, wherein the optical modulator is configured to convey weighted beams that correspond to asserted bits.

2. The digital optical power modulator of claim 1, further comprising an optical combiner coupled to receive weighted beams from the optical modulator and configured to combine the weighted beams to produce a modulated beam having a discrete optical power.

3. The digital optical power modulator of claim 2, further comprising a lookup table configured to receive a desired digital power value and coupled to provide the first digital signal.

4. The digital optical power modulator of claim 2, wherein said binary power divider, said optical modulator, and said optical combiner are implemented as portions of an optical integrated circuit using planar waveguides.

5. The digital optical power modulator of claim 1, wherein the set of weighted beams includes a series of weighted beams with corresponding optical powers which sequentially increase by a factor of two.

6. The digital optical power modulator of claim 1, wherein the optical modulator comprises a plurality of optical switches each coupled to receive a respective one of the weighted beams and the corresponding bit, wherein each of the optical switches is configured to convey the weighted beam when the corresponding bit is asserted, and wherein the optical switch is configured to absorb the weighted beam when the corresponding bit is de-asserted.

7. The digital optical power modulator of claim 1, wherein the optical modulator comprises a plurality of optical switches each coupled to receive a respective one of the weighted beams and the corresponding bit, wherein each of the optical switches is configured to convey the weighted beam when the corresponding bit is asserted, and wherein the optical switch is configured to misdirect the weighted beam when the corresponding bit is de-asserted.

8. The digital optical power modulator of claim 6, wherein the first digital signal is binary electrical signal.

9. A precision digital optical power modulator that comprises:

a binary power divider configured to receive an input light beam and responsively provide a first set of weighted beams with corresponding optical powers, wherein the first set of weighted beams includes a series of weighted beams with corresponding optical powers which sequentially increase by a factor of two;
a linear power divider coupled to the binary power divider to receive one of the weighted beams in the first set and configured to responsively provide a second set of weighted beams with corresponding optical powers which are substantially equal; and
an optical modulator coupled to receive the first set of weighted beams from the binary power divider and the second set of weighted beams from the linear power divider, wherein the optical modulator is configured to receive a first digital signal having a binary representation with bits which correspond to the weighted beams in the first set, wherein the optical modulator is configured to receive a second digital signal having a binary representation with bits which correspond to the weighted beams in the second set, and wherein the optical modulator is configured to pass weighted beams that correspond to asserted bits.

10. The precision digital optical power modulator of claim 9, further comprising an optical combiner coupled to receive weighted beams from the optical modulator and configured to combine the weighted beams to produce a modulated beam having a discrete optical power.

11. The precision digital optical power modulator of claim 10, further comprising a lookup table configured to receive the first digital signal and coupled to provide the second digital signal to the optical modulator.

12. The precision digital optical power modulator of claim 11, wherein the optical modulator comprises a plurality of optical switches each coupled to receive a respective one of the weighted beams and the corresponding bit, wherein each of the optical switches is configured to pass the weighted beam when the corresponding bit is asserted, and wherein the optical switch is configured to misdirect the weighted beam when the corresponding bit is de-asserted.

13. A method for digitally modulating a light beam, wherein the method comprises:
receiving the light beam;
splitting the light beam into a set of weighted beams with optical powers which sequentially increase by a factor of two;
receiving a digital signal having a binary representation with bits which correspond to the weighted beams; and
combining the weighted beams having corresponding bits that are asserted to form a modulated beam.

14. The method of claim 13 further comprising blocking the weighted beams having corresponding bits that are de-asserted.

15. The method of claim 13, wherein the splitting comprises passing the light beam through a series of Y-junctions and providing one output beam from each junction as one of the weighted beams.

16. The method of claim 13 further comprising applying a desired digital modulation value to a lookup table to produce the digital signal.

* * * * *